US005962849A

United States Patent [19]

Saito et al.

[11] Patent Number: 5,962,849

[45] Date of Patent: Oct. 5, 1999

[54] PARTICLE SELECTION METHOD AND A TIME-OF FLIGHT MASS SPECTROMETER

[75] Inventors: Naoaki Saito, Tsukuba; Mitsumori Tanimoto, Ushiku; Kazuyoshi Koyama; Yasushi Iwata, both of Tsukuba, all of Japan

[73] Assignee: Agency of Industrial Science & Technology, Tokyo, Japan

[21] Appl. No.: 08/826,311

[22] Filed: Mar. 25, 1997

[30] Foreign Application Priority Data

Nov. 5, 1996 [JP] Japan .................................... 8-292838

[51] Int. Cl.[6] ............................ G01D 59/44; H01J 49/00

[52] U.S. Cl. .......................... 250/287; 250/288; 250/282

[58] Field of Search .................................... 250/282, 286, 250/287, 288

[56] References Cited

U.S. PATENT DOCUMENTS

| | | | |
|---|---|---|---|
| 3,935,451 | 1/1976 | Janes | 250/283 |
| 4,072,862 | 2/1978 | Mamyrin et al. | 250/286 |
| 5,032,722 | 7/1991 | Boesl et al. | 250/287 |
| 5,120,958 | 6/1992 | Davis | 250/287 |
| 5,510,613 | 4/1996 | Reilly et al. | 250/287 |
| 5,625,184 | 4/1997 | Vestal et al. | 250/287 |
| 5,654,545 | 8/1997 | Holle et al. | 250/287 |

OTHER PUBLICATIONS

N. Saito et al., A Time–of–Flight Mass Spectrometer Using Double Pulsed Acceleration, pp. 25–33, *Bulletin of the Electrotechnical Laboratory,* vol. 10, Feb. 1997.

W.A. de Heer, Time–of–Flight Mass Spectrometry, p. 623, *Rev. Mod. Phys.,* vol., 65, No. 3, Jul. 1993.

M. Kato et al., Resolution of Time–of–Flight Mass Spectrometers Evaluated for Secondary Neutral Mass Spectrometry 1947–1948, *Rev. Sci. Instrum.,* 59(9), Sep. 1988.

*Primary Examiner*—Bruce C. Anderson
*Attorney, Agent, or Firm*—Workman, Nydegger & Seeley

[57] ABSTRACT

In the time-of-flight mass spectrometer, the mass spectrometer with high resolution is provided which defines the initial position and the initial velocity of the charged particles and selects only the stable charged particles to measure.

First, all of the charged particles Pe are accelerated to one direction in a homogeneous or spatially uniform electric field during a common finite period of time, and then all of the charged particles Pe are accelerated to the opposite direction of the former in a homogeneous or spatially uniform electric field during a common finite period of time and given the same momentum in the opposite direction of the former. Two kind of particle selection method can be adopted. Only the charged particles Pe passing through a predetermined position at a predetermined time are selected by the selector. The charged particles Pe passing through the selector are defected by the first and second deflectors and then only the charged particles passing through a predetermined point of the slit are selected and reach the ion detector. Finally, the mass spectrum is obtained by measuring the time-of-flight of the particles using the ion detector.

9 Claims, 3 Drawing Sheets

PARTICLE SELECTION METHOD AND A TIME-OF FLIGHT MASS SPECTROMETER

The contents of Japanese Patent Application No. 8-292838 filed Nov. 5, 1996 is hereby incorporated by reference.

BACKGROUND OF THE INVENTION

1. Field of the Invention

The present invention relates to a particle selection method of analyzing a mass of particles or selecting particles like atoms, molecules, ions, or ultrafine particles (clusters) with a high resolution, and a time-of-flight mass spectrometer as a particle selection apparatus.

2. Description of Related Art

FIG. 1 shows an example of a conventional time-of-flight mass spectrometer. As shown in FIG. 1, the mass spectrometer has an ionization laser 1, an accelerator 2, a deflector 3, a reflector 4, and an ion detector 5. When measuring a mass spectrum of molecules, ultrafine particles, or the like, those neutral particles P are first irradiated by laser using the ionization laser 1 and are ionized to form charged particles (ions) Pe. The charged particles Pe are accelerated only over a constant distance by a static electric field between electrodes 2*a* and 2*b* of the accelerator 2 and then are deflected by the deflector 3 in a predetermined manner. Then they are reflected by the static electric field in the reflector 4 to be impinged on the ion detector 5. This method cannot exclude the charged particles with the mass or charge state changed during the acceleration or during the flight. The charged particles Pe of different masses do not pass the same position at the same time after the acceleration.

In the process of the ionization, for example, by the ionization laser 1, molecules or ultrafine particles existing within a finite region become charged particles, so that their initial positions are distributed. Since molecules or ultrafine particles are introduced to the ionization region as a neutral beam, they already have initial velocities before the acceleration by the electric field, and moreover those initial velocities are distributed. Those distributions of the initial positions and the initial velocities decrease mass resolution remarkably. Therefore in general, the conventional methods adopt a two-stage acceleration method or a two-stage reflector, but those methods cannot remove perfectly the factors which decrease those mass resolution.

In the process of the ionization, internal energy of the charged particles increase and the some charged particles decay by fission into charged fragments or dissociate while emitting or evaporating a part of their particles. The time-of-flight of the charged particle which have decayed or dissociated after the instance of the ionization is different from those of the parent particles and those of particles with the same mass as the fragmented particles, resulting in a significant decrease in mass resolution. The reflector 4 of the conventional time-of-flight mass spectrometer can reduce the influence in same degree, but not perfectly.

In a conventional time-of-flight mass spectrometer, charged particles with different masses do not pass the same position at the same time after the starting of the acceleration. Thus, only charged particles of a particular mass is subject to the laser irradiation in small region after the ionization. In addition, a conventional time-of-flight mass spectrometer cannot measure only charged particles with prescribed charge state.

SUMMARY OF THE INVENTION

It is, therefore, an object of the present invention is to remove the above-mentioned defects and to provide a particle selection method and a time-of-flight mass spectrometer overcoming the above-mentioned defects by means of the double pulsed acceleration for a constant period of time instead of the conventional scheme of accelerating over a constant distance.

According to the first aspect of the present invention, a particle selection method comprises the steps of:

accelerating a plurality of ionized charged particles to a direction by a homogeneous or spatially uniform electric field during a common finite period of time;

accelerating the plurality of charged particles to an opposite direction of the direction by the homogeneous or spatially uniform electric field during the common finite period of time, and providing the same momentum to all of the plurality of charged particles; and passing only the charged particles having the same initial condition through the same position at the same time after the completion of the acceleration.

In the particle selection method, the homogeneous or spatially uniform electric field E is applied to electrodes in the form of pulse, and the field $E<0$ between the time $t=0$ and the time $t=\alpha$, and the field $E=0$ between the time $t=\alpha+\beta$ and the time $t=\alpha+\beta+\gamma$, and the field $E>0$ between the time $t=\alpha+\beta$ and the time $t=\alpha+\beta+\gamma$.

In the particle selection method, the form of pulse is generated by a pulse generator.

In the particle selection method, the pulse generator is a rectangle pulse generator.

According to the second aspect of the present invention, a particle selection method comprises the steps of:

under the predetermined initial conditions, accelerating a plurality of charged particles to a direction by a homogeneous or spatially uniform electric field during a common finite period of time;

accelerating the plurality of charged particles to an opposite direction of the direction by the homogeneous or spatially uniform electric field during the common finite period of time, and giving the same momentum to all of the plurality of charged particles; and excluding the passing of the charged particles changing the mass or the charge state after the time of ionization, passing through only the stable charge particles.

In the particle selection method, the mass or the charged state of the charged particle is changed by a laser irradiation.

According to the third aspect of the present invention, a time-of-flight mass spectrometer comprises:

a double pulsed accelerator for accelerating a plurality of charged particles to one direction by a homogeneous or spatially uniform electric field during a common finite period of time, and for subsequently accelerating the plurality of charged particles to a direction opposite to the one direction by a homogeneous or spatially uniform electric field during a common finite period of time to provide the same momentum to all of the plurality of charged particles;

a selector arranged at a special focus defined in relation to an output from the double pulsed accelerator for selectively outputting charged particles passing through the special focus;

a first deflector and a second deflector for deflecting stable particles of the plurality of charged particles passed through the selector;

a slit for selectively passing an output from the second deflector which is only one of stable particles having no change of mass or charge state and particles which having a specific change of charge-to-mass ratio; and an ion detector for measuring a time-of-flight of the charged particles from the slit.

Here, the time-of-flight mass spectrometer may further comprise a excitation laser for the laser irradiation.

In the time-of-flight mass spectrometer, the electric field $E_{y0}$ of the first deflector and the second deflector is $$E_{y0}=-V_{beam}<f\tau>/jd$$

where $V_{beam}$ is the initial velocity of the charged particle on y-axis, $<f\tau>$ is the integration of the electric field f applying on the double pulsed accelerator from the time t=0 to the time t=τ, j is any integer greater than 0, d is the length of each of the first deflector and the second deflector on x-axis.

The above and other objects, effects, features and advantages of the present invention will become more apparent from the following description of the embodiments thereof taken in conjunction with the accompanying drawing.

DETAILED DESCRIPTION OF THE PREFERRED EMBODIMENTS

The present invention will now be described with reference to the accompanying drawing.

EMBODIMENT 1

Figure 1:
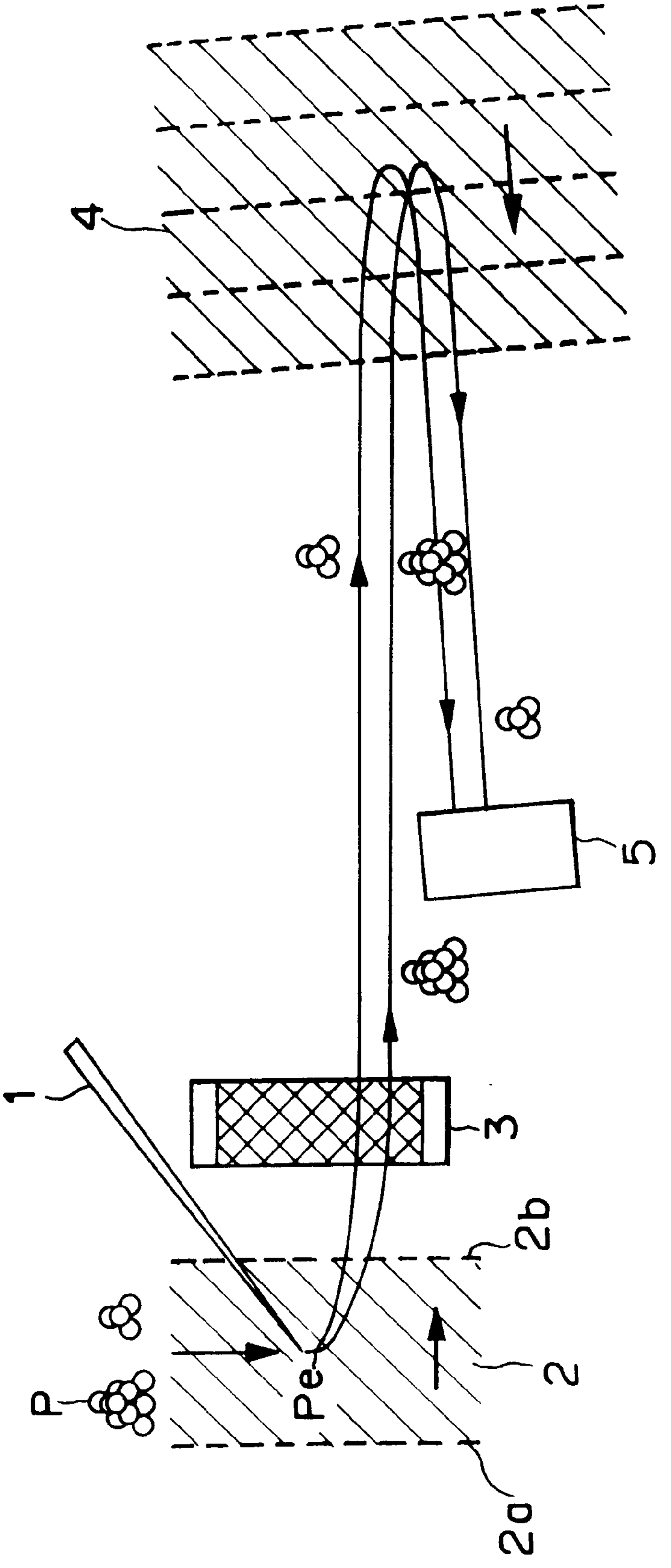
FIG. 1 (PRIOR ART)
FIG. 1 is a schematic diagram showing an example of a conventional time-of-flight mass spectrometer.
Figure 2:
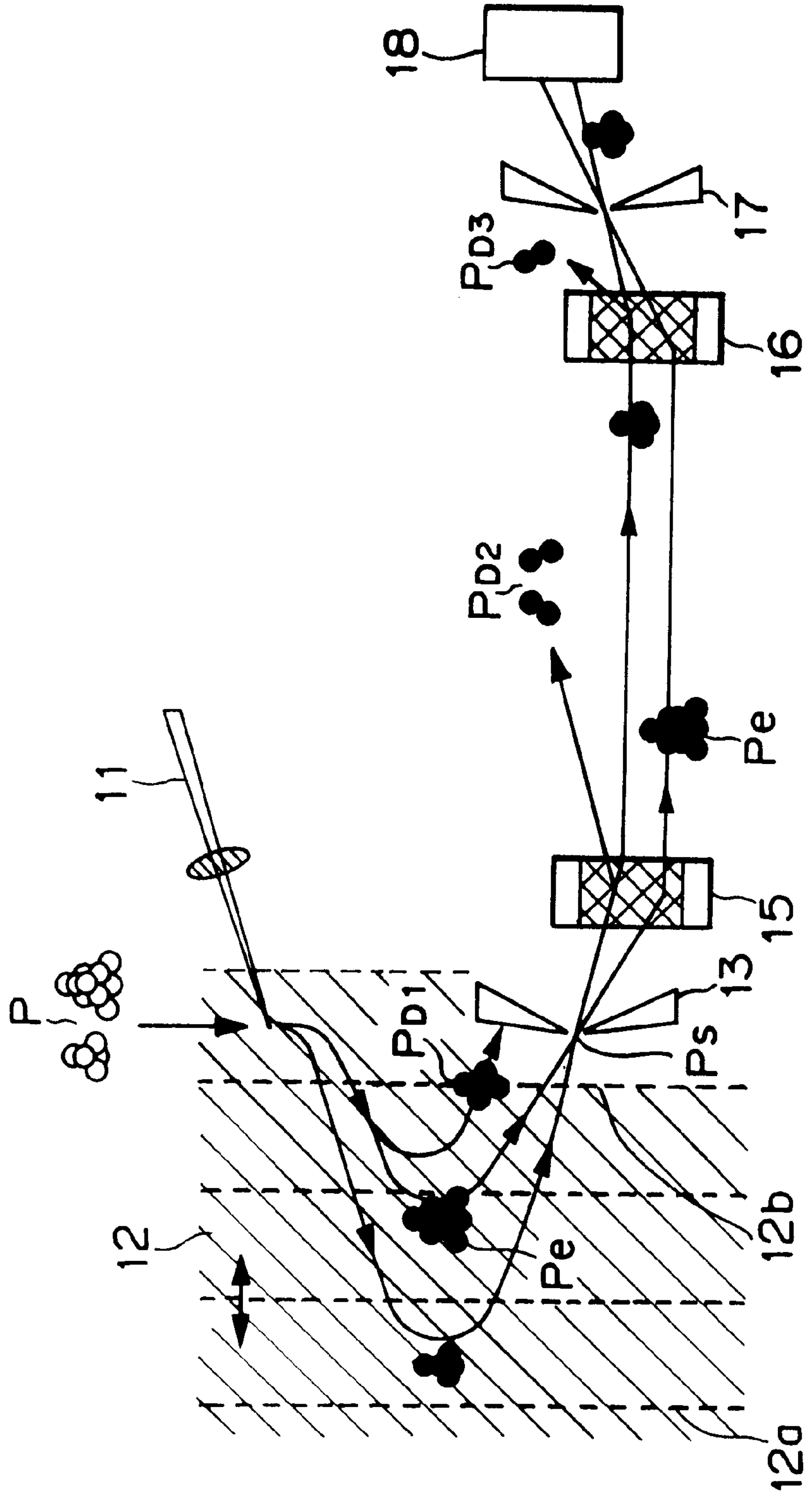
FIG. 2 is a schematic diagram showing an embodiment of a time-of-flight mass spectrometer in accordance with the present invention.

FIG. 2 shows the structure of an embodiment 1 of a time-of-flight mass spectrometer in accordance with the present invention. As shown in FIG. 2, the time-of-flight mass spectrometer has an ionization laser 11 for ionizing a plurality of neutral particles, and a double pulsed accelerator 12 for accelerating a plurality of the charged particles ionized by the ionization laser 11 to one direction by a homogeneous or spatially uniform electric field during a common finite period of time, as well as subsequently accelerating a plurality of charged particles to a direction opposite to the one direction by a homogeneous or spatially uniform electric field during a common finite period of time to provide the same momentum to all of the plurality of charged particles. The time-of-flight mass spectrometer further has a selector 13 arranged at a special focus defined in relation to the particular position, where by the double pulsed acceleration of the double pulsed accelerator 12, all the charged particles with the same initial condition pass through at the same time independent of their mass or charge state. The time-of-flight mass spectrometer also has a first deflector 15 and a second deflector 16 for deflecting stable particles of the plurality of charged particles passed through the selector 13, and a slit 17 for selectively passing and output from the second deflector 16 which is only one of the stable particles with no change of mass and charge state during the flight or the particles with a prescribed change of charge-to-mass ratio between the selector 13 and the deflector 16, and an ion detector 18 for measuring a time-of-flight of the charged particles passed through the slit 17.

In FIG. 2, P denotes neutral particles like molecules or ultrafine particles whose mass spectrum is to be measured, Pe denotes charged particles which are formed from the neutral particles P by the ionization laser 11, PD1 denotes the particles which have decayed or dissociated during the double pulsed acceleration and do not reach the special focus. $P_{D2}$ denotes charged particles which have decayed or dissociated after passing through the selector 13 before reaching at the first deflector 15, and $P_{D3}$ denotes charged particles which have decayed or dissociated after passing through the first deflector 15 before reaching at the second deflector 16.

The double pulsed accelerator 12 has, for example, mesh electrodes 12*a* and 12*b*. A positive voltage is first applied between the electrodes 12 and 12*b* and then a negative voltage is applied between the electrodes 12*a* and 12*b* to doubly accelerate the charged particles for a common finite period of time.

The double pulsed acceleration by the double pulsed accelerator 12 of the present invention allows the charged particles Pe with the same initial condition (initial position and initial velocity) to pass through the particular position at the particular time independent of mass or charge state of the charged particles. The point in the phase space or the world of space and time specified by combination of the particular time (focus time) and the particular position (focus point) is defined as a special focus. Using a selector 13 to select only the charged particles Pe passing through the special focus Ps can select only the charged particles Pe determined by initial condition. Since the charged particles $P_{D1}$ has decayed and dissociated in the process of double pulsed acceleration cannot reach the focus point, those particles may be excluded.

For the selected charged particles Pe, the component of the velocity along the direction of the acceleration is inversely proportion to the mass while the component of velocity along the direction perpendicular to the acceleration is constant independent of the mass. The first deflector 15 aligns all of those charged particles Pe to be the parallel beam, and then the second deflector 16 deflects them to pass through the predetermined point of the slit 17. The flight time of the charged particles from the special focus Ps to the ion detector 18 is proportional to the mass of each of the charged particles.

About those actions, we explain as follows.

(A) Motion of charged particles by acceleration

A homogeneous electric field f(t) is applied in the direction of the x-axis only from the time t=0 to t=τ. That is to say, the following equation (1) of electric field E(t) is given. Variation of f(t) as a function of time will be explained later.

$$E(t)=0{:}t<0$$

$$E(t)=f(t){:}\ 0\leqq t\leqq\tau \qquad (1)$$

$$E(t)=0{:}\tau<t$$

Let the mass and the charge state of the charged particle be denoted by m and q, respectively. Then the x-coordinate x(t) of the charged particle Pe at the time t, the velocity $v_x(t)$ in the direction of the x-axis, the y-coordinate y(t), and the velocity $v_y(t)$ in the direction of the y-axis are expressed as the following equation (2):

$$Vx(t) = V_{x0} + \frac{q}{m}\int_0^{t} dt' E(t') \qquad (2)$$

$$X(t) = X_0 + V_{x0}t + \frac{q}{m}\int_0^{t} dt' \int_0^{t'} dt'' E(t'')$$

$$Vy(t) = V_{y0}$$

$$y(t) = y_0 + V_{y0}t$$

where x0≡x(0) and y0≡y(0) are the initial positions, $v_{x0}\equiv v_x(0)$ and $v_{y0}\equiv v_y(0)$ are components of the initial velocity.

In the following expressions (3), we use the abbreviation below.

$$[f(b,a]\equiv\int^b{}_a dt'f(t')$$

$$[fb]\equiv[f(b,\ 0)]$$

$$[f(b,a)^2]\equiv\int^b{}_a dt'\int^{t'}{}_a dt''f(t'')$$

$$[fb^2]\equiv[f(b,0)^2]$$

The velocity and the position at the time t≧τ are expressed as as the following equation (4).

$$Vx(t) = V_{x0} + \frac{q}{m}\langle f\tau\rangle \qquad (4)$$

$$X(t) = X_0 + V_{x0}t + \frac{q}{m}\langle f\tau\rangle\left\{t - \tau + \frac{\langle f\tau^2\rangle}{\langle f\tau\rangle}\right\}$$

$$Vy(t) = V_{y0}$$

$$y(t) = y_0 + V_{y0}t$$

From those notations, the results can be obtained that an increment of the momentum $mv_x(t)$ in the direction of x-axis is q<f τ> independent of the mass, and an increment of the velocity in the direction of x-axis is inversely proportional to the mass-to-charge ratio m/q. And further the result can be obtained that all of the charged particles with the same $x_0$, $y_0$, $v_{x0}$, $v_{y0}$ pass the position (5)

$$X\text{focus}\equiv X0+Vx0t\ \text{focus} \qquad (5)$$

$$Y\text{focus}\equiv y0+Vy0t\ \text{focus}$$

at the time (6)

$$t_{focus} \equiv \tau - \frac{\langle f\tau^2\rangle}{\langle f\tau\rangle} \qquad (6)$$

independent of the mass and charge, (or it will look like the particles coming from the above position if we go back along the orbit). The point in the phase space or the world of space and time specified by combination of the particular time (focus time) $t_{focus}$ and the particular position (focus point) $x_{focus}$, $y_{focus}$ is defined as a special focus Ps. The charged particles with a different initial condition have another special focus Ps. Thus, a selector 13 which passes the particles through a focus point at a focus time may select only the charged particles Pe determined by the initial condition.

To realize the special focus Ps, it must be required that $t_{focus}$≧τ and the following equations (7) must be satisfied.

$$f(t)=-g(t)\leqq 0{:}0\leqq t\leqq\alpha \qquad (1a)$$

$$f(t)=0{:}\alpha<t<\alpha+\beta \qquad (1b)$$

$$f(t)=h(t)\geqq 0{:}\alpha+\beta\geqq\alpha+\beta+\gamma=\tau \qquad (1c)$$

$$[f\tau]=-[g\alpha]+[h(\tau,\ \alpha+\beta)]>0 \qquad (1d)$$

$$[f\tau^2]=-[g\alpha^2 9\ -[g\alpha](\tau]-\alpha)+[h(\tau,\ \alpha+\beta)^2]\leqq 0 \qquad (7)\ (1e)$$

The above conditions are: the charged particles Pe are first accelerated to the negative (left) direction along the x-axis (1*a*), and then (1*b*), accelerated to the positive (right) direction along the x-axis (1*c*), finally received the momentum to the positive direction as a whole (1*d*), have zero or negative value of X-coordinate at the time τ (1*e*). Those conditions are independent of variations of g(t) and h(t) as a function of time t. Adopting the acceleration method satisfied the above equations and the selector 13, the charged particles Pe determined by initial conditions can be selected. In an ordinary case, the charged particles Pe with $x_0$=0,$y_0$=0, vx0=0, vy0=$v_{beam}$≠0 are selected to measure mass spectrum.

Next, we consider the motion of the charged particles $P_{D1}$ varying their mass or charge state in the process of acceleration. Consider the case when we select the charged particles Pe with $x_0$=0,$y_0$=0, vx0=0 $v_{y0}$=$v_{beam}$≠0. We assume that the charged particles with mass m and charge state q dissociate a part of their particles or changes their charge state and become the charged particles $P_{D1}$ with mass m" and charge state q" at the time t=72 (where 0≦η≦τ). The X-coordinate of the charged particles $P_{D1}$ at the time t=$t_{focus}$ is described as as the following equations (8).

$$X\left(t_{focus} : \frac{m}{q} \to \eta\frac{m^{2''}}{q^{2''}}\right) = X_{focus} + \left(\frac{q''}{m''} - \frac{q}{m}\right)\frac{\{\langle f(\tau,\eta)^2\rangle\langle f\tau\rangle - \langle f\tau^2\rangle\langle f(\tau,\eta)\rangle\}}{\langle f\tau\rangle} \qquad (8)$$

By the conditions (1*a*–1*e*), it can be expressed that f(t) satisfies $$\frac{\langle f(\tau,\eta)^2\rangle\langle f\tau\rangle-\langle f\tau^2\rangle\langle f(\tau,\eta)\rangle}{\langle f\tau\rangle}\geq 0 \quad (9)$$

independent of η. Therefore, the particles $P_{D1}$ changing their mass or charge state do not pass in the focus point $x_{focus}$ at the time $t_{focus}$, and may be excluded by a selector 13.

(B) Deflection of the charged particles by the deflector

To simplify the explanation, we assume the case that we select the charged particles Pe as a target with initial condition $x_0=0$, $y_0=0$, $v_{x0}=0$, $x_{y0}=V_{beam}\neq 0$. The position and the velocity at the time $t=t_{focus}$ are $$X(t_{focus})=X_{focus}=0 \quad (10)$$
$$y(t_{focus})=V_{beam}t_{focus}$$
$$Vx(t_{focus})=\frac{q}{m}\langle f\tau\rangle$$
$$Vy(t_{focus})=V_{beam}.$$

Further we consider the experiment of the stability of particles, where some of the charged particles Pe with mass m and charge state q become the particles $P_{D1}$ with mass m" and charge state q" by the laser irradiation on the special focus Ps.

In the ordinary case when there is no laser irradiation on the special focus Ps and no changes in mass or charge state, we may choose m=m", q=q".

In order for the charged particles Pe can pass through the predetermined point of the slit 17 on x-coordinate x=R, the electric field along the direction of y-axis is applied by the first deflector 15 at a≦x≦(a+d) and the second deflector 16 at R–(a+d)≦x≦R–a. For the electric field of deflection, the following equation (11) of electrostatic field is considered.

$$Ey=0 \quad X\leqq a$$
$$Ey=Ey0 \quad a\leqq x\leqq a+d$$
$$Ey=0 \quad a+d\leqq X\leqq R-(a+d) \quad (11)$$
$$Ey=Ey0 \quad R-(a+d)\leqq X\leqq R-a$$
$$Ey=0 \quad R-a\leqq X\leqq R$$

The charged particles $P_{D2}$, which have decayed or dissociated after passing through the selector 13 before reaching at the first deflector 15, have the y-coordinate at slit X=R described below. In the case of the charged particle Pe with no charge of mass and charge state, we may put the relations m"=m and q"=q in the notation (12).

$$y(x=R)=V_{focus}t_{focus}+\frac{m}{q}\left\{1+\frac{mq''}{m''q}\frac{d}{V_{beam}\langle f\tau\rangle}E_{yo}\right\}V_{beam}\frac{R}{\langle f\tau\rangle} \quad (12)$$

For the electric field of the first deflector 15 and the second deflector 16, if the following electric field $$E_{yo}=-\frac{V_{beam}\langle f\tau\rangle}{d} \quad (13)$$

is used, then $$y(X=R)=V_{beam}t_{focus}\frac{m}{q}\left\{1-\frac{m}{q}\frac{q''}{m''}\right\}V_{beam}\frac{R}{\langle f\tau\rangle} \quad (14)$$

is obtained, thus, all of the charged particles Pe, where the mass and charge state do not change (m=m" and q=q"), may pass through predetermined point y (x=R)=$V_{beam}t_{focus}$ of the slit 17. At slit 17, only the charged particles Pe passing through the point are selected. The charged particles $P_{D2}$ which have decayed or dissociated after passing through the selector 13 before reaching at the first deflector 15 may be excluded from the measurement by slit 17 since the particles are away from the point. Similarly, the charged particles PD3 which have decayed or dissociated from the first deflector 15 up to the second deflector 16 may be excluded from the measurement since the particles are away from the point of the slit 17.

(C) The measurement of the flight time by the detector

Selected charged particles Pe with initial condition $x_0=0$, $y_0=0$, $v_{x0}=0$, $v_{y0}=V_{beam}\neq$ impinge on the ion detector 18 at x=L after they pass through the slit 17 at X=R. The time-of-flight TOF of the charged particles from the special focus Ps to the detector 18 is, $$TOF=\frac{m}{q}\frac{L}{\langle f\tau\rangle} \quad (15)$$

thus the mass can be measured by measuring the time-of-flight.

The conditions of the acceleration method of the present invention are the conditions comprising the followings: using the homogeneous or spatially uniform electric field, accelerating first the charged particles Pe to the negative direction along the x-axis during a common finite period of time, and then accelerating to the positive direction along the x-axis during a common finite period of time, finally giving the momentum to the positive direction along x-axis as a whole from the electric field, the charged particles have zero or negative value of X-coordinate at the time of the end of acceleration τ. The conditions are fully independent of variation of the electric field as a function of time. The electric field in the form of pulse is applied by electrodes, for example, using a pulse generator. Here we explain the first embodiment of the present invention with the simple case using a pulse generator, especially a rectangle pulse generator.

The homogeneous or spatially uniform electric field is generated between the electrodes by applying the voltage using the pulse generator. Here we use the pulse generator which generates rectangle pulses.

First the homogeneous or spatially uniform negative electric field E=–A<0 is generated between the electrodes from the time t=0 until the time t=α. Next the homogeneous or spatially uniform positive electric field E=B>0 is generated between the electrodes from the time t=α+β until the time α+β+γ.

That is to say, $$f(t)=-g(t)=-A<0 \;:0\leqq t\leqq \alpha$$

$$f(t)=0 \;:\alpha<t<\alpha+\beta \tag{16}$$

$$f(t)=h(t)=B>0 \!:\alpha+\beta\leqq t\leqq \alpha+\beta+\gamma=\tau$$

and the above expressions satisfy the conditions (1$a$, 1$b$, 1$c$). And $$\langle g\alpha^2\rangle = \frac{A\alpha^2}{2} \tag{17}$$

$$\langle g\alpha\rangle = A\alpha$$

$$\langle h(\tau,(\alpha+\beta)^2\rangle = \frac{B\gamma^2}{2}$$

$$\langle h(\tau,\alpha+\beta\rangle = B\gamma$$

are obtained. By substituting the above expressions into the conditions (1$d$, 1$e$) to be satisfied, we obtain the followings (18).

$$\langle f\tau\rangle = -A\alpha+\beta\gamma>0 \tag{18}$$

$$\langle f\tau^2\rangle = -\frac{A\alpha^2}{2} - A\alpha(\beta+\gamma) + \frac{\beta\gamma^2}{2} \leq 0$$

There are infinite combinations of A, B, α, β, γ satisfying the above conditions.

For example, in the case of A=B and γ=2α≧0, with the condition, $$\beta\geqq 0 \tag{19}$$

we obtain the followings (20).

$$t_{focus} = \tau + \frac{\alpha+2\beta}{2} \tag{20}$$

$$X(t\geq\tau) = X_0 + V_{x0}t + \frac{q}{m}A\alpha(t-t_{focus})$$

$$Vx(t\geq\tau) = V_{x0} + \frac{q}{m}A\alpha$$

$$y(t\geq\tau) = y_0 + V_{y0}t$$

$$y(X=R) = y_0 + V_{beam}t_{focus} + \left\{t_{focus} + \frac{R}{Vx_0+\frac{q}{m}A\alpha}\right\}(Vy_0 - V_{beam}) - \frac{V_{beam}}{Vx_0+\frac{q}{m}A\alpha}\left\{X_0 + \left\{t_{focus} - \frac{R}{Vx_0+\frac{q}{m}A\alpha}\right\}Vx_0\right\}.$$

Therefore if only the charged particles Pe passing through the point x=0, y=$_{vbeamtfocus}$ at the time t=$_{tfocus}$ are selected by the selector 13, the charged particles with initial condition $x_0$=0,$y_0$=0, $V_{x0}$=0, $v_{y0}$=$v_{beam}$≠0 may be selected independently with the mass or charge state and may be passed through the point y (x=R)=$_{vbeamtfocus}$ of the slit 17. However, by the selector 13, the charged particles $P_{D1}$ with $x_0$+$v_{xo}t_{focus}$=0 and $y_0$+$V_{y0}t_{focus}$=$v_{beamtfocus}$ may not be excluded, on the other hand, since the charged particles $P_{D1}$ on the above example pass the position $$y(X=R) = V_{beam}t_{focus} + \frac{R}{V_{x0}+\frac{q}{m}A\alpha}\left\{V_{y0} - V_{beam} + \frac{V_{beam}V_{x0}}{Vx_0+\frac{q}{m}A\alpha}\right\} \tag{21}$$

of the slit 17, almost all of the charged particles $P_{D1}$ are excluded by the slit 17.

As explained above, only the objective charged particles Pe with initial condition $x_0$=0, $y_0$=0, $v_{x0}$=0, $v_{y0}$=$v_{beam}$≠0 may pass through the focus position x=0 at the focus time $t_{focus}$, and via the first deflector 15 and the second deflector 16, may pass through the predetermined point of the slit 17 to impinge the ion detector 18. By using the time-of-flight $$TOF = \frac{m}{q}\frac{L}{\langle f\tau\rangle} \tag{22}$$

the mass spectrum can be measured.

EMBODIMENT 2

Figure 3:
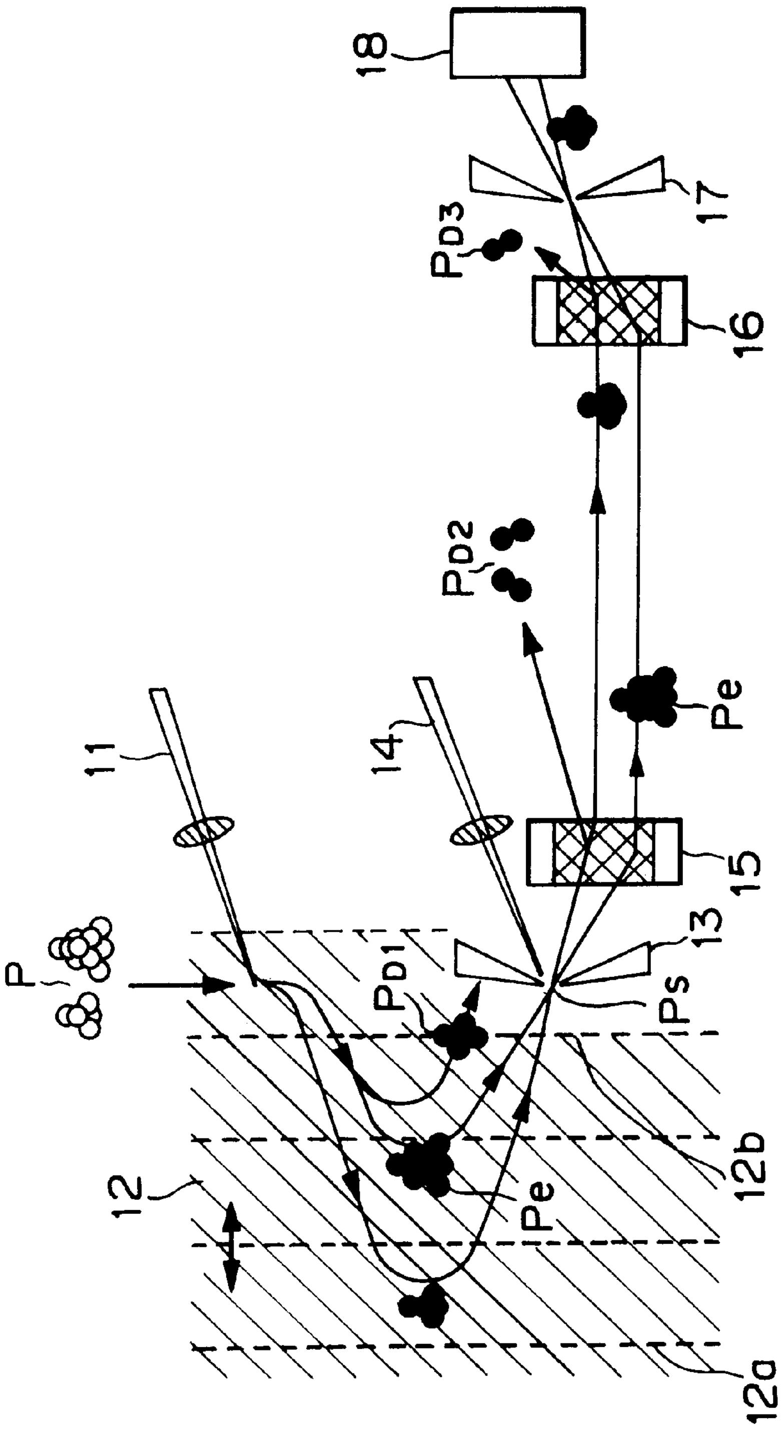
FIG. 3 is a schematic diagram showing an embodiment of a time-of-flight mass spectrometer in accordance with the present invention.

FIG. 3 shows the structure of an embodiment 2 of a time-of-flight mass spectrometer in accordance with the present invention. As shown in FIG. 3, the time-of-flight mass spectrometer has an ionization laser 11 for ionizing a plurality of neutral particles, and a double pulsed accelerator 12 for accelerating a plurality of the charged particles ionized by the ionization laser 11 to one direction by a homogeneous or spatially uniform electric field during a common finite period of time, and for subsequently accelerating a plurality of the charged particles to a direction opposite to the one direction by a homogeneous or spatially uniform electric field during a common finite period of time to provide the same momentum to all of plurality of the charged particles. The time-of-flight mass spectrometer further has a selector 13 arranged at a special focus defined in relation to the particular position, where by the double pulsed acceleration of the double pulsed accelerator 12, the charged particles with the same initial condition pass through at the same time independent of their mass or charge state. The time-of-flight mass spectrometer also has an excitation laser 14 for irradiating at the special point, a first deflector 15 and a second deflector 16 for deflecting stable particles of the plurality of charged particles passed through the selector 13, particles and a slit 17 for selectively passing and output from the second deflector 16 which is only one of the stable particles with no change of mass and charge state by laser irradiation of the excitation laser 14 at the special focus or the particles with a prescribed change of charge-to-mass ratio, and an ion detector 18 for measuring a time-of-flight of the charged particles passed through the slit 17.

In FIG. 3, P denotes neutral particles like molecules or ultrafine particles to be measured a mass spectrum, Pe denotes charged particles which are formed by means of ionizing the neutral particles P by the ionization laser 11, $P_{D1}$ denotes the particles which has decayed or dissociated during the double pulsed acceleration and do not reach the special focus Ps. $P_{D2}$ denotes charged particles which have decayed or dissociated after passing through the selector 13 before reaching at the first deflector 15, and $P_{D3}$ denotes charged particles which have decayed or dissociated after passing through the first deflector 15 before reaching at the second deflector 16.

The double pulsed accelerator 12 has, for example, mesh electrodes 12*a* and 12*b*. A positive voltage is first applied between the electrodes 12 and 12*b* and then a negative voltage is applied between the electrodes 12*a* and 12*b* to doubly accelerate the charged particles for a constant time duration.

The embodiment 2 is the measurement of stability of the charged particles. Consider the experiment that the charged particles after the ionization are irradiated by the laser 14 and the internal energy of the charged particles are increased. By the laser irradiation at the focus time $t_{focus}$ on the focus point x=0, all of the charged particles with the same initial conditions may be treated at once independently of their mass and charge state. As explained in the above "(B) Deflection of the charged particles by the deflector", the unstable charged particle $P_{01}$ or $P_{02}$ with changed the mass or charged state may not pass through the predetermined point of the slit 17 and may be excluded. Only the stable charged particle Pe with no change of the mass or charge state may be measured.

The measurement of charge state is conducted as the same laser irradiation as the embodiment 2. However, the electric field for the first deflector 15 and the second deflector 16 is $$E_{y0} = -\frac{V_{beam}\langle f\tau\rangle}{jd}\, j = 1, 2, 3, 4, \ldots \tag{23}$$

Therefore, $$y(X = L) = V_{y0}t_{focus} + \frac{m}{q}\left\{1 - \frac{mq''}{jm''q}\right\}\frac{V_{y0}L}{\langle f\tau\rangle} \tag{24}$$

By the slit 17, all of the charged particles Pe of j times the charge-to-mass ratio q/m may be selected. The mass-to-charge ratio m/q is derived from $$TOF = \frac{m}{q}\frac{L}{\langle f\tau\rangle}. \tag{25}$$

Using this method, in the case where the mass does not change and only the charge state changes, all of the charged particles Pe which change their charge state to the particular state q"=jq alone may be selected.

The present invention has been described in detail with respect to various embodiments, and it will now be apparent from the foregoing to those skilled in the art that changes and modifications may be made without departing from the invention in its broader aspects, and it is the invention, therefore, in the appended claims to cover all such changes and modifications as fall within the true spirit of the invention.

What is claimed is:

1. A particle selection method comprising the steps of:

applying alternating positive and negative voltages to effect double pulsing of a plurality of charged particles during a common finite period of time, whereby said charged particles are accelerated in first one direction by a homogeneous or spatially uniform electric field during said common finite period of time, which does not exceed that period of time defined by when the accelerated particles escape from the uniform electric field, and then accelerating said plurality of ionized charged particles to an opposite direction of said one direction by said homogeneous or spatially uniform electric field during said common finite period of time, so that the same momentum is provided to all of said plurality of charged particles; and passing only the charged particles having the same initial condition through the same position at the same time after the completion of said acceleration.

2. The particle selection method as claimed in claim 1, wherein said homogeneous or spatially uniform electric field E is applied to electrodes in the form of pulse, and the field E<0 between the time t=0 and the time t=α, and the field E=0 between the time t=α and the time t=α+β, and the field E>0 between the time t=α+β and the time t=α+β+τ.

3. The particle selection method as claimed in claim 2, wherein said form of pulse is generated by a pulse generator.

4. The particle selection method as claimed in claim 3, wherein said pulse generator is a rectangle pulse generator.

5. A particle selection method comprising the steps of:

imparting the same momentum to a plurality of charged particles by applying alternating positive and negative voltages to effect double pulsing of the plurality of charged particles during a common finite period of time, whereby the charged particles are accelerated in first one direction by a homogeneous or spatially uniform electric field during said common finite period of time, which does not exceed that period of time defined by when the accelerated particles escape from the uniform electric field, and then accelerating said plurality of ionized charged particles to an opposite direction of said one direction by said homogeneous or spatially uniform electric field during said common finite period of time; and excluding the passing of charged particles changing their mass or charge state after the time of ionization, there passing through only stable charged particles.

6. The particle selection method as claimed in claim 5, wherein the mass or the charge state of said charged particles is changed by a laser irradiation.

7. A time-of-flight mass spectrometer comprising:

a double pulsed accelerator for applying alternating positive and negative voltages to effect double pulsing of a plurality of charged particles during a common finite period of time, whereby said charged particles are accelerated in first one direction by a homogeneous or spatially uniform electric field during said common finite period of time, which does not exceed that period of time defined by when the accelerated particles escape from the uniform electric field, and then accelerating said plurality of ionized charged particles to an opposite direction of said one direction by said homogeneous or spatially uniform electric field during said common finite period of time, so that the same momentum is provided to all of said plurality of charged particles;

a selector arranged at a special focus defined in relation to a particular position where, by the double pulsed acceleration of said double pulsed accelerator, said charged particles having a same initial condition pass through at a same time independent of the mass or charge of said charged particles;

a first deflector and a second deflector for deflecting stable particles of said plurality of charged particles passed through said selector;

a slit for selectively passing an output from said second deflector which is comprised only of those stable particles having no change of mass or charge state and particles which ha a specific change of charge-to-mass ratio; and an ion detector for measuring time-of-flight of said charged particles from said slit.

8. The time-of-flight mass spectrometer as claimed in claim 7, further comprising an excitation laser for irradiating of laser at said special focus.

9. The time-of-flight mass spectrometer as claimed in claim 7, wherein the electric field $E_{y0}$ of said first deflector and said second deflector is $$E_{y0}=-V_{beam}<f\tau>/jd$$

where $V_{beam}$ is the initial velocity of the charged particle on y-axis, $<f\tau>$ is the integration of the electric field f applying on said double pulsed accelerator from the time $t=_0$ to the time $t=\tau$, j is any integer greater than 0, d is the length of each of said first deflector and said second deflector on x-axis.

* * * * *

UNITED STATES PATENT AND TRADEMARK OFFICE

CERTIFICATE OF CORRECTION

PATENT NO. : 5,962,849

DATED : Oct. 5, 1999

INVENTOR(S) : Saito et al.

It is certified that error appears in the above-identified patent and that said Letters Patent is hereby corrected as shown below:

Cover Page, Abstract, line 13, after "Two" change "kind" to --kinds--

Col. 1, line 56, after "charged" change "particle" to --particles--

Col. 1, line 62, after "influence" change "in" to --to the--

Col. 1, line 67, after "mass" change "is" to --are--

Col. 2, line 1, after "in" insert --a--

Col. 2, line 8, after "invention" delete "is"

Col. 3, line 10, after "particles" change "passed" to --passes--

Col. 3, line 15, after "which" change "having" to --have--

Col. 3, line 20, after "comprise" change "a" to --an--

Col. 4, line 37, after "electrodes" change "12" to --12a--

Col. 4, line 60, after "is" change "inversely" to --in inverse--

Col. 6, line 30, change "$f(t)=h(t)\geq 0:\alpha+\beta \geq \alpha+ \beta+\gamma =\tau$" to --$f(t)=h(t)\geq 0:\alpha +\beta \leq t\leq \alpha + \beta+\gamma =\tau$--

UNITED STATES PATENT AND TRADEMARK OFFICE

CERTIFICATE OF CORRECTION

PATENT NO. : 5,962,849

DATED : Oct. 5, 1999

INVENTOR(S) : Saito et al.

It is certified that error appears in the above-identified patent and that said Letters Patent is hereby corrected as shown below:

Col. 6, line 34, change "$[f\tau^2]=-[g\ \alpha^2 9-[g\alpha\ ](\tau]-\alpha\ )+[h(\tau,\ \alpha+\beta\ )^2]\leq 0$" to --$[f\tau^2]=-[g\alpha\ ^2]-[g\alpha\ ](\tau-\alpha\ )+[h(\tau,\ \alpha+\beta\ )^2]\leq 0$--

Col. 6, line 47, change "vx0=0, vy0=$v_{beam}\neq 0$" to --$v_{xo}=0$, $v_{yo}=v_{beam}\neq 0$--

Col. 6, line 52, change "vx0=0" to --$v_{xo}=0$,--

Col. 6, line 58, after "described" change "as as" to --in--

Col. 8, line 28, change "$v_{yo}=V_{beam}\neq$ " to --$v_{yo}=V_{beam}\neq 0$--

Col. 10, line 61, after "measured" insert --on--

Col. 10, line 65, after "which" change "has" to --have--

Col. 11, line 2, after "reaching" delete "at"

Col. 11, line 8, after "electrodes" change "12" to --12a--

UNITED STATES PATENT AND TRADEMARK OFFICE

CERTIFICATE OF CORRECTION

PATENT NO. : 5,962,849

DATED : October 5, 1999

INVENTOR(S) : Saito, et. al.

It is certified that error appears in the above-identified patent and that said Letters Patent is hereby corrected as shown below:

Col. 11, line 22, after "changed" delete "the"

Col. 13, line 9, after "which" change "ha" to --have--

Signed and Sealed this

Fourteenth Day of November, 2000

Attest:

Q. TODD DICKINSON

*Attesting Officer*

*Director of Patents and Trademarks*